US007255769B2

(12) United States Patent
van der Pluym et al.

(10) Patent No.: US 7,255,769 B2
(45) Date of Patent: Aug. 14, 2007

(54) METHOD FOR SPLICING AND COATING WEBS AS WELL AS A WEB OBTAINED WITH SUCH METHODS

(75) Inventors: Anton van der Pluym, Raamsdonkveer (NL); Fuyuhiko Mori, Tilburg (NL); Gerard van Oosterbaan, Tilburg (NL); Tinus van Riel, Tilburg (NL)

(73) Assignee: Fujifilm Manufacturing Europe B.V., Tilburg (NL)

( * ) Notice: Subject to any disclaimer, the term of this patent is extended or adjusted under 35 U.S.C. 154(b) by 0 days.

(21) Appl. No.: 10/326,235

(22) Filed: Dec. 19, 2002

(65) Prior Publication Data

US 2003/0152740 A1 Aug. 14, 2003

(30) Foreign Application Priority Data

Dec. 21, 2001 (EP) ................................ 01205066

(51) Int. Cl.
*B32B 37/22* (2006.01)
*B32B 37/24* (2006.01)
*B32B 7/12* (2006.01)
*B31F 5/06* (2006.01)

(52) U.S. Cl. .................. 156/280; 156/304.3; 427/299; 428/61

(58) Field of Classification Search ................ 156/157, 156/159, 304.1, 304.3, 278, 280; 428/61; 427/299, 420
See application file for complete search history.

(56) References Cited

U.S. PATENT DOCUMENTS 2,952,559 A * 9/1960 Nadeau ...................... 427/472
3,127,303 A * 3/1964 Neuhauser et al. ........... 428/61
3,206,323 A * 9/1965 Miller et al. ................ 430/531
3,518,141 A * 6/1970 McDonald et al. ......... 156/157
4,024,302 A 5/1977 Takagi et al.
4,041,201 A * 8/1977 Wurker ..................... 428/41.9
4,146,661 A * 3/1979 Grandel et al. ........... 428/42.3
4,172,001 A 10/1979 Heetderks
4,398,982 A 8/1983 Witerski et al.
4,487,645 A * 12/1984 Weston ....................... 156/157
5,658,420 A * 8/1997 Rossini ...................... 156/504
5,725,708 A * 3/1998 Earle et al. ................. 156/157
6,197,148 B1 * 3/2001 Deprez et al. ........... 156/304.3
2002/0172790 A1 * 11/2002 Nagel et al. ............... 428/40.1

* cited by examiner

*Primary Examiner*—Mark A. Osele
(74) *Attorney, Agent, or Firm*—Banner & Witcoff, Ltd.

(57) ABSTRACT

The present invention relates to a method for splicing successive rolls of webmaterial to one endless web, in such way that during subsequent coating of the web, coating defects near the splices are reduced, preferably prevented. To that end at least part of the trailing edge of the splicing tape used to splice the succeeding webs, is left free of adhesive. Because of this, air, which during said coating process gets entrapped behind the splice, between the coating layer and the web, can dissipate between the adhesive-free tape edge and the underlying web surface, thus reducing or preventing the formation of air bubbles and subsequent coating defects.

The possible reoccurrence of discontinuity coating defects at very high coating speeds can be reduced or prevented by subjecting the surface of the web to be coated to an electrostatic charge before applying the coating.

21 Claims, 5 Drawing Sheets

| TRAILING EDGE OF COATED SPLICE | | | |
|---|---|---|---|
| PROCESS CONDITIONS | 280 m/min | 380 m/min | |
| | 0 Volt | 0 Volt | 500 Volt |
| PRIOR ART<br>° 25 μm PET<br>° 30 μm Glue<br>° Full width glued |  |  |  |
| INVENTION<br>° 25 μm PET<br>° 30 μm Glue<br>° 4 mm absence of glue on trailing edge |  |  |  |

METHOD FOR SPLICING AND COATING WEBS AS WELL AS A WEB OBTAINED WITH SUCH METHODS

FIELD OF THE INVENTION

The present invention relates to a method for splicing successive rolls of webmaterial to one endless strip of webmaterial, prior to applying at least one coating layer to said webmaterial in a continuous, high speed coating process.

The invention farther relates to a web obtained with a method according to the present invention, having at least one spliced joint and at least one layer of coating material, said coating layer having reduced, preferably no discontinuity coating defects near the joint.

BACKGROUND OF THE INVENTION

Substrata of photographic films and papers are usually coated with aqueous solutions of hydrophilic colloid materials in an uninterrupted coating process. To this end supply rolls Or webs of material to be coated are joined together (spliced) prior to the coating process. This is usually accomplished by means of a piece of tape 6, which is glued to a trailing edge 3 of a preceding web 1 and a leading edge 4 of a newly supplied web 2 by means of an adhesive 5, as shown in FIG. 1. The resulting continuous web can then be uninterruptedly coated with at least one coating layer 8. However, when said coating layer 8 traverses the trailing edge of the splicing tape 6, the coating layer 8 cannot instantaneously make contact with the surface of the succeeding web 2. As a consequence air 7, entrained at the trailing edge of said splicing tape 6, may be entrapped between the coating layer 8 and the surface of the succeeding web 2. This causes several problems.

Firstly, the entrapped air may cause bubble defects, as shown in FIG. 2. These bubble defects result in areas of non-uniformity in the coating distribution which makes the product unsuitable for sale, Furthermore, at the areas of non-uniformity the coating layer can be locally thicker, requiring more time to dry. Consequently, when said bubbled areas reach a first pass roll that guides the coated web through the process, the liquid coating layer may not have completely dried. When passing said first pass roll the bubbles may burst and the not yet completely dried coating may contaminate the first roll and subsequent pass rolls. The contamination will hit the passing web various times before being completely removed by the passing web. This results in a considerable loss of coated products and in delays in the production, due to necessary cleaning of the coating apparatus.

As the coating speed is increased, the above-signalised problems will increase accordingly, since more air will become entrapped between the coating layer and the web surface behind the trailing edge of the splicing tape.

Various methods and countermeasures have been suggested to prevent the above described coating non-uniformities and coating defect problems.

Bourns et al. (Eastman Kodak, DE 1,805,734) suggests in 1969 to use filler material to smooth the gap between the web, the coating layer and the trailing edged of the splicing tape. In addition a special, tapered splicing tape is disclosed to reduce said gap and the unevenness and bubbles.

A different method is disclosed in 1979 by Heetderks et al. (Eastman Kodak, U.S. Pat. No. 4,172,001). The method involves the use of two different splicing tapes, a first tape being sufficiently strong for constituting the actual connection between the two webs and a second, very thin tape, placed on top of the trailing edge of the first tape, for covering the gap between the web, the coating layer and the trailing edge of the first splicing tape.

In 1977 Takagi et al. (Fuji Photo Film, U.S. Pat. No. 4,024,302) discovers that a small area of coarsened web surface immediately following the trailing edge of the splicing tape can prevent unevenness and coating discontinuities. A similar method is proposed by Deprez in 2001. (Eastman Kodak, U.S. Pat. No. 6,197,148) involving the application of a rough layer immediately after the trailing edge of the splicing tape.

DeRoeck et al. (Agfa Gevaert, U.S. Pat. No. 4,235,655) discloses yet another method in 1980. The splicing tape used in this application has its leading edge adhered to an upper surface of the trailing end of a preceding web and its trailing edge adhered to a lower surface of the leading end of a succeeding web. The webs are separated from each other over a distance of at least ten times their thickness. The tape thus forms a flexible connection between the two webs, wherein both discontinuities at the upper side of the webs to be coated are "step-up" discontinuities, which are known to be less harmful than "step-down" discontinuities.

A completely different method is developed by Verkinderen at al. (Agfa-Gevaert, U.S. Pat. No. 4,269,647) In this method a splicing tape is adhered against a lower side of the webs, after which a fast-drying hydrophobic coating is applied to the upper side around the splicing tape area. Subsequently the upper surface of the webs and tape is coated with a hydrophilic emulsion coating.

Finnicum (Eastman Kodak, U.S. Pat. No. 5,154,951) developed in 1992 a method and an apparatus to reduce the coating defects caused by the splicing tape by controlling a vacuum at the upper side of the web when the splice arrives at the coating apparatus, in such a way, that no air gets entrapped between the coating layer and the trailing edge of the splicing tape. This prevents the formation of coating defects.

With the known methods the splice induced coating defects may be reduced in some cases, but the splices remain a Source of potential problems. The more so as the coating speed has increased since the disclosure of the above-cited prior art. Furthermore, all above cited prior-art countermeasures require modifications to the splicing process and the need for additional operations and means, making the splicing process more complex. In fact, some of the intended improvements, such as the suggested changes to the shape of the splicing tape and the tape material may even bring on new problems.

The object of the invention is to provide an improved method for splicing successive webs to one continuous web, wherein the occurrence of non-uniformities and coating defects during subsequent coating of the spliced web is reduced, preferably eliminated.

SUMMARY OF THE INVENTION

In accordance with the present invention there is provided a method for splicing successive webs to one continuous web characterized by the features of claim 1.

By leaving at least part of the trailing edge of the splicing tape facing the webs free of adhesive, the forming of air bubbles and subsequent coating defects downstream of said splice can be reduced. This is because air, which during said coating process gets entrapped behind the splice, between the coating layer and the web, can dissipate between the adhesive-free tape edge and the underlying web surface. Consequently, less or no air bubbles will be formed downstream of said trailing edge. Hence, a uniform coating pattern can be achieved without thickness variations, even at coating speeds which are significantly higher than those mentioned in the prior-art methods. Moreover, since there are no air bubbles which can collapse, the usual contamination of the pass rolls does not occur, resulting in less lose of contaminated material and less valuable operation time spent on cleaning said contaminated pass rolls. Furthermore, the present invention does not require considerable modifications to the conditions of the splicing process nor to the splicing equipment.

The reduction of air bubbles has turned out to be most significant when the trading tape edge is free of adhesive over its entire width, viewed in a direction perpendicular to the transport direction of the successive webs. Preferably the length of the adhesive free edge, measured in the transport direction, is at least 0.1 mm. It will be clear to those skilled in the art, that the amount of air which can dissipate between the tape edge and the underlying web surface will increase as the length over which said edge is free of adhesive increases. It will furthermore be clear that as the coating speed increases, the amount of entrapped air between the coating layer and the webs will increase as well, inducing the need for a lengthier adhesive free tape edge. By way of an example it has been found that at a coating speed of about 280 m/min an adhesive free trailing edge with a length of around 4 mm will give good coating results.

The invention further relates to a method for applying a continuous coating to a series of successive webs, wherein said webs are spliced by a method according to the present invention and subsequently coated with at least one continuous coating layer.

In an advantageous embodiment, a method for applying a continuous coating layer according to the present invention is characterized by the features of claim 6.

Surprisingly it has been discovered that subjecting the surface of the web to an electrostatic charge before applying a coating layer can help to reduce the presence of air bubbles in combination with a splicing method according to the present invention.

The invention further relates to a web comprising at least one splicing joint, obtained with a method according to the present invention.

BRIEF DESCRIPTION OF THE DRAWINGS AND PICTURES

To explain the invention, exemplary embodiments of a method and web will hereinafter be described with reference to the accompanying drawings, wherein.

Table 1 shows the size of the air bubble defect as a function of the thickness of the splicing tape applied according to a prior art method compared to the present invention;

Table 2 shows the size of the air bubble defect as a function of the length l of the splicing tape, which is free of adhesives; and Table 3 shows the size of the air bubble defect as a function of the coating speed, with and without electrostatic treatment of the web surface prior to coating.

DETAILED DESCRIPTION OF THE INVENTION

Figure 1:
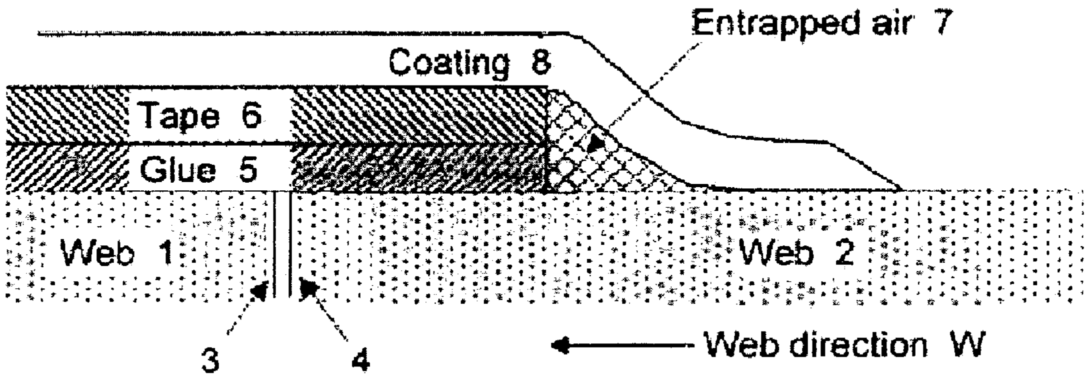
FIG. 1 shows a schematic cross sectional view of a coated spliced web according to a prior art reference.
Figure 2:
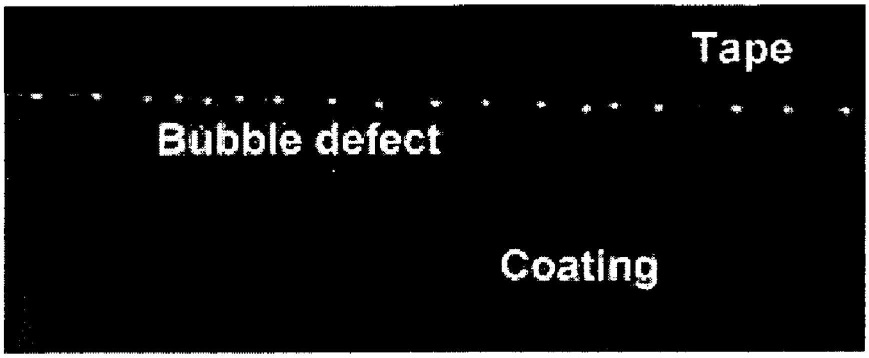
FIG. 2 shows a picture of a bubble defect, as caused by the prior art reference of FIG. 1.
Figure 3:
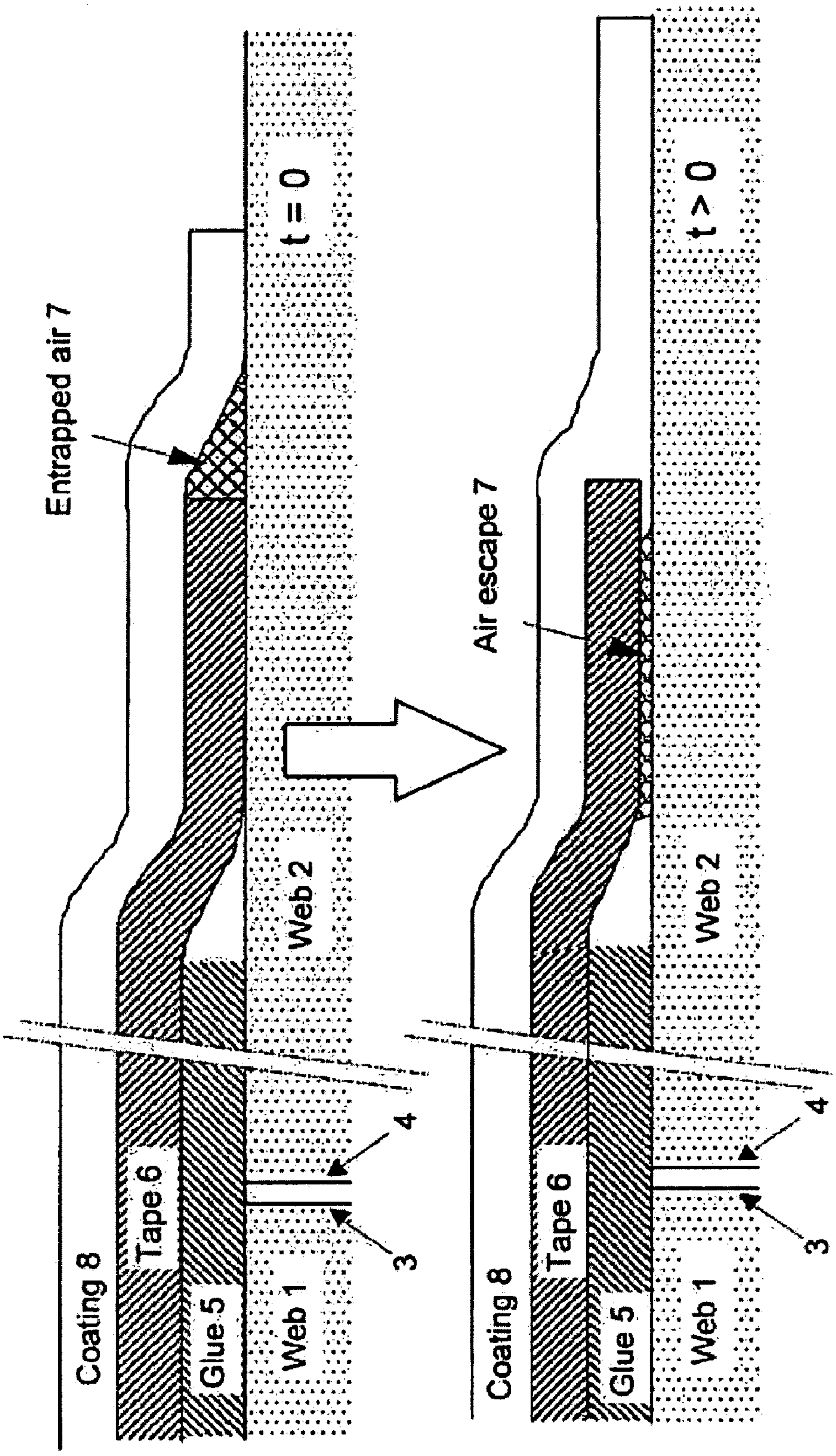
FIG. 3 shows a schematic cross sectional view through two subsequent webs, spliced according to a preferred embodiment of the present invention.

FIG. 3 shows two webs being spliced together according to an advantageous embodiment of the present invention. The same reference numbers have been given to parts corresponding to parts in FIG. 1. FIG. 3 shows a trailing edge 3 of a preceding web 1 and a leading edge 4 of a succeeding web 2, being connected to each other by a splicing tape 6, which has been adhered to the top surfaces of said edges 3, 4 by means of an adhesive layer 5. The trailing edge of the splicing tape 6 has been left free of adhesive and consequently rests loosely on the top surface of the succeeding web 2.

Like in the known prior art methods, when a coating layer 8 is successively applied to the preceding and succeeding web 1, 2, an amount of air 7 will get entrapped between said coating layer 8 and the succeeding web 2 at time t=0, that is as soon as the coating layer 8 passes the end of the trailing edge of the tape 6. This entrapped air 7 gives cause to the formation of air bubbles, causing non-uniformities, coating defects and possible contamination of coated material. This ultimately results in loss of material and delay in the coating process, due to time needed to remove the contaminations of the coating equipment.

However, thanks to the adhesive free trailing edge of the splicing tape 6, entrapped air 7 can, at a time >0, escape under said tape edge which is loosely resting on top of the surface of the succeeding web 2. Consequently, no air bubbles will be formed behind the trailing tape edge.

The volume of entrapped air 7 behind the trailing edge of the splicing tape 6 will usually increase as the coating speed increases and/or as the thickness of the trailing edge of the tape 6 increases.

The present invention provides an efficient method to prevent the formation of air bubbles during coating of spliced webs up to relatively high coating speeds. However, above a certain coating speed air bubbles may reoccur. Surprisingly it has been found that said reoccurrence of air bubbles can be prevented by combining the splicing tape configuration according to the present invention with electro-static-assist technology, wherein an electrostatic charge is applied to the web surface before covering said surface with a coating layer. Combining the prior art tape with electro-static-assist technology does not prevent the occurrence of defects. It merely decreases the intensity (table 1).

A series of parameters (such as an increase of total coating flow liquid, an increase of the viscosity of the bottom layer, a reduction of the coating pressure, an increase of the coating gap, a reduction of the web temperature) were tested, wherein with the prior-art reference splicing tape an increase of the size of the air bubble defects were observed but surprisingly no influence on the size of the air bubble defects was noticed with the splicing tape of the present invention simply because no air bubble defects occurred.

Another advantage of the present invention is that no extra modifications have to be selected for the splicing process condition nor to the splicing equipment.

It looks like that the tape will adapt itself to the actual process conditions, the higher the speed, the larger the volume of the entrapped air. The invention prevented the occurrence of bubbles completely under a variety of process conditions, for all kinds of coating, liquid parameters, web speeds and web materials. At high coating speeds, the beneficial effect of the splicing method according to the invention was also effective when the splicing tape was used in combination with an electro-static-treatment. (see table 3)

If the splicing tape was used at mild process conditions (like coating speeds below 300 m/min) no air bubbles were observed near the interface of the trailing edge of the splicing tape and the coated web surface. However, at more severe process conditions, like at coating speeds exceeding 300 m/min, a bubble defect re-appeared at some distance from the trailing edge of the splicing tape. This defect disappeared however completely when an electrostatic charge treatment was applied before the coating (see FIG. 6). Hence, over the whole range of coating speeds tested, no air bubble defects happened with the invented splicing tape material.

Therefore, webs spliced according to the invention, can be subjected to higher coating speeds, which is important for every manufacturer, who aims to produce at the highest possible speed for economic reasons.

Figure 4:
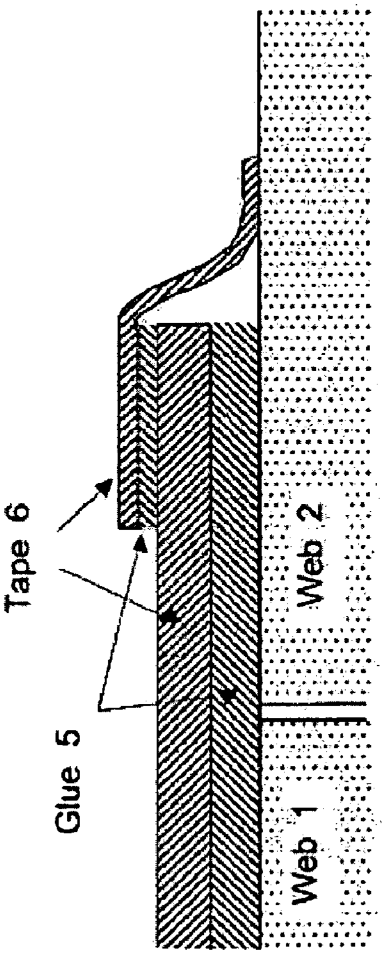
FIG. 4 shows a schematic cross sectional view through two spliced webs according to an alternative embodiment of the present invention.

When the trailing edge of a first splicing tape is completely adhered to the succeeding supply roll and a second splicing tape is adhered on top of the trailing edge of the first splicing tape, while no adhesive is present at the last part of the second splicing tape, the formation of air bubble defects is similarly hampered as in the case with the single splicing tape of the present invention having no adhesives at its trailing edge (FIG. 4).

Application of this method of using a splicing tape according the present invention means a major coat reduction as a result of less operational down-time, less wasted product material, less cleaning time required for contaminated pass roller and coating equipment, higher coating speed capabilities, less drying capacity requirements.

The method of this invention is also effective when more than one coating layer is applied on the web material wherein the coating layer contains emulsions comprising silver halide and gelatine solutions. As coating method of this invention slide bead coating can be applied as well as curtain coating.

The present invention is effective for various substrate supports which are applicable for photographic applications like base paper, a polyolefin laminated base paper, a synthetic polypropylene paper, various film supports (like triacetate cellulose, polyethylene terephthalate).

The following examples will farther explain this invention.

EXAMPLE 1 (REFERENCE)

A color print photographic paper is coated on webs of base paper support with coating solutions at a speed of 280 m/min, wherein the base paper support is extrusion laminated with a polyolefinic resin layer. A multi-layer system was coated having a total liquid flow of 67 ml/m$^2$, of which the bottom layer had a flow of 10 ml/m$^2$, comprising silverhalide emulsions and gelatine solutions. The standard viscosity of the bottom layer is 4 mPa·s, the viscosity of the other layers varies between 10 and 100 mPa·s, and the coating temperature is 35° C. The standard coating is carried out with a coating gap of 200 μm between the coating head and the web support at an under pressure of 60 mm aqua. Prior to the coating two paper rolls were spliced together by means of a polyethylene terephthalate splicing tape having a thickness of 25 μm (excluding adhesives) and a total thickness of 55 μm (including adhesives). The width of the total tape is 50 mm.

Figure 5:
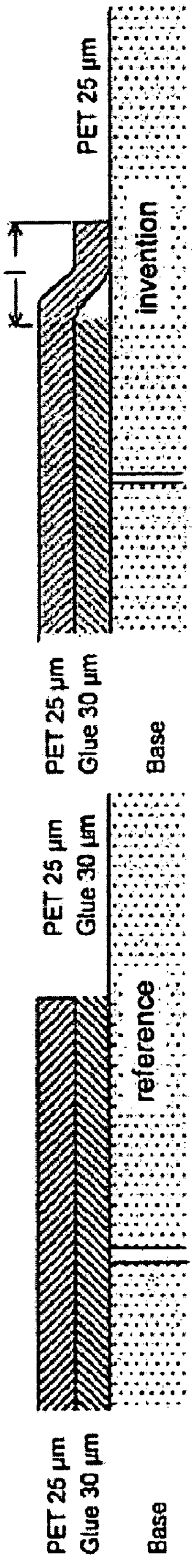
FIG. 5 shows a schematic cross sectional view comparing a prior art spliced web with a spliced web according to the present invention.

FIG. 5 shows the cross-sections of the reference splicing tape as used in the prior-art.

Table 1 shows the size of the air bubble defects as a function of various tape thicknesses for the prior-art splicing tape material. The bubble size as shown in the table is achieved by measuring the diameter by microscopic equipment and averaging over more than 30 measurements. The size of the air bubble defects after coating is minimised when the thickness of the splicing tape is reduced. Additionally applying an electrostatic polar charge before the actual coating reduces the defect size of the air bubbles after coating with about 40%. However the formation of air bubbles can be reduced but certainly not completely be prevented.

TABLE 1

Defect size [μm] related to tape thickness and web charge treatment

| | Detect size [μm] (at coating speed = 280 m/min) | | | |
|---|---|---|---|---|
| If tape thickness [μm] = | 25 | 55 | 80 | 110 |
| Prior-art tape, 0 V | 180 | 420 | 780 | 1170 |
| Prior-art tape, 2500 V | 100 | 265 | 440 | 700 |
| Invention tape, 0 V | 0 | 0 | 0 | 0 |

EXAMPLE 2 (INVENTIVE)

In case the trailing edge of the invented splicing tape does not contain adhesives at its bottom part over a length of 4 mm (see FIG. 5), the same experiments are carried out by varying the thickness of the invented splicing tape material, while the other process parameters remained the same, as is described above in example 1.

When the splicing tape of the present invention is applied surprisingly no air bubble defects are encountered which appears to be independently from the thickness of the splicing tape as is shown in table 1.

EXAMPLE 3 (INVENTIVE)

This example describes the relation between the length of the invented stroke at the trailing edge of the splicing tape containing no adhesives at its bottom side and the size of the air bubble defects after coating at the same coating conditions as described in example 1. The reference splicing tape with a total thickness of 55 μm resulted in the formation of air bubble defects after coating with a size of 420 μm at the process conditions of example 1.

TABLE 2

Bubble size related to absence of adhesion (invention)

| | (Inventive) | | | |
|---|---|---|---|---|
| Length [in mm] of no adhesive stroke at splicing tape (length 1 as indicated in FIG. 5) | 0.5 | 3 | 5 | 10 |
| Size of air bubble detect after coating [in μm] | 0 | 0 | 0 | 0 |

It is clear from table 2 that a length of 0.5 mm splicing tape without adhesives is sufficient to prevent air entrapment, which usually lead to the formation of large air bubble defects with the reference splicing tape. In fact, smaller trailing lengths can suffice. However, for practical reasons the production of splicing tape without containing adhesives can be most easily accomplished when the trailing length is set at 4±1 mm.

EXAMPLE 4 (REFERENCE)

Table 3 shows the formation of the size of the air bubble defects as a function of coating speed for the reference splicing tape, with and without electrostatic web treatment.

When the coating speed is increased, the air bubble defect becomes larger when a tape is used as described in the prior art. The size of the air bubble defect is only reduced when an electrostatic pre-treatment is applied before coating.

TABLE 3

Defect size [μm] related to coating speed and electrostatic web treatment

| | Defect size [μm] (at tape thickness = 55 μm) | | | | | |
|---|---|---|---|---|---|---|
| If coating speed [m/min] = | 150 | | 280 | | 380 | |
| If web voltage [V] = | 0 | 500 | 0 | 500 | 0 | 500 |
| Defect size with prior-art tape | 240 | 210 | 420 | 335 | 510 | 405 |
| Defect size with invention tape | 0 | 0 | 0 | 0 | 595 | 0 |

EXAMPLE 5 (INVENTIVE)

Table 3 shows also the formation of the size of the air bubble defects as a function of coating speed for the invented splicing tape having no adhesives over a length of 4 mm at the trailing edge of the splicing tape.

When the coating speed is increased, no air bubble defects are observed up to about 300 m/min. However when the coating speed is increased further, a slightly different air bubble defect appears. Also this defect can be eliminated completely with the invented splicing tape, when the invented splicing tape is treated additionally with an electrostatic pre-treatment as shown in table 3.

Figure 6:
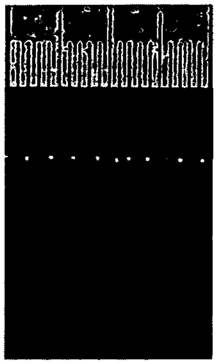
FIG. 6 shows pictures of coated spliced webs according to the invention.
Figure 6:
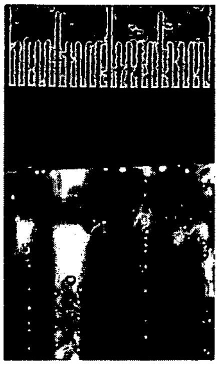
Figure 6:
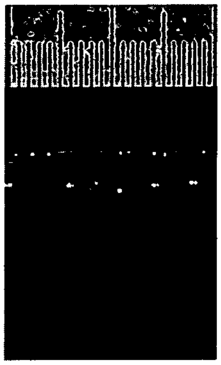
Figure 6:
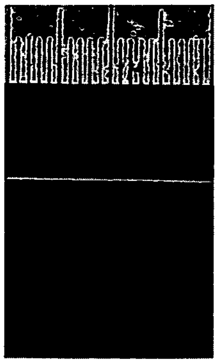
Figure 6:
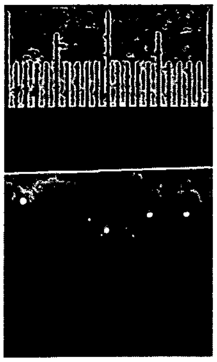
Figure 6:
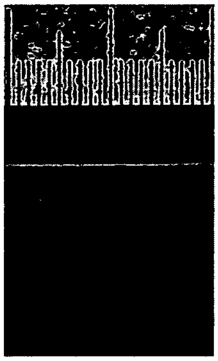

Pictures of the coating result for the reference and invented splicing tape materials are shown in FIG. 6 for several test conditions from table 3.

The invention is by no means limited to the embodiments represented in the description and the drawings. Many variations thereto are possible.

For instance, instead of leaving the trailing edge of the splicing tape free of adhesive, a porous type of adhesive, which is permeable to air or air absorbent, can be applied to adhere the tape onto the or each web. In that way, air getting entrapped between the coating layer and the web material during the coating process, can escape under the trailing edge of the tape via said porous adhesive. Such porous adhesive can be simply applied on the trailing edge alone, or on the whole surface of the tape facing the webs. The adhesive has the added advantage, that the trailing edge will not rest loosely on the underlying web and consequently cannot curl up in any way for any reason whatsoever during the coating process.

Furthermore it is noted, that the principle of enabling the escape of air, being entrapped between the coating layer and the underlying surface is by no means limited to the "butt-type" of splice as shown in the figures, wherein the trailing and leading edge of the successive webs lie in abutment to each other, but can equally be applied to other types of splices known in the art, such as for instance a splice wherein the trailing and leading edges of the successive webs are overlapping each other, or a splice configuration as shown in FIG. 4.

These and many other modifications are understood to fall within the framework of the invention.

The invention claimed is:

1. A method for forming a coated continuous web, comprising the steps of:

obtaining a continuous web including a splice characterized by a splicing tape completely adhered to a trailing edge of a preceding web and partly adhered to a leading edge of a succeeding web with respect to a transport direction of the continuous web with the splicing tape having a trailing edge free of adhesive and resting loosely on the succeeding web;

transporting the continuous web while applying at least one coating to the surface of the continuous web and allowing air trapped between the coating and the continuous web to dissipate between the trailing edge of the splicing tape free of adhesive and the continuous web.

2. The method according to claim 1, wherein the trailing edge of the splicing tape is free of adhesive over its entire width, viewed in a direction perpendicular to the transport direction of the continuous web.

3. The method according to claim 1, wherein the at least partly adhesive-free edge of the splicing tape has a length, viewed in the transport direction, of at least 0.1 mm.

4. The method according to claim 1, wherein the at least partly adhesive-free edge of the splicing tape has a length, viewed in the transport direction, of around 4 mm.

5. The method according to claim 1, wherein the surface of the continuous web is electrostatically charged before applying the coating.

6. The method according to claim 5, wherein the surface of the continuous web is electrostatically charged by applying a voltage in the range of 200 V to 500 V.

7. The method according to claim 5, wherein the coating speed is higher than 250 m/min.

8. The method according to claim 5, wherein the surface of the web is electrostatically charged by applying a voltage in the range of 250 V to 500 V.

9. The method according to claim 5, wherein the surface of the web is electrostatically charged by applying a voltage in the range of 300 V to 500 V.

10. The method according to claim 5, wherein the coating speed exceeds 300 m/min.

11. The method according to claim 1, wherein the surface of the continuous web is coated with at least one layer of an aqueous solution of a colloid.

12. The method according to claim 1, wherein the continuous web comprises one or more materials selected from the group consisting of base paper, a polyolefin laminated base paper, a synthetic polypropylene paper, a triacetate cellulose film and a polyethylene terephthalate film.

13. A method for applying a continuous coating to a series of successive webs of photographic substrata, comprising the following steps:

placing a trailing edge of a preceding web of photographic substrata at or next to a leading edge of a succeeding web of photographic substrata with respect to a transport direction of said webs, connecting said webs of photographic substrata to form a continuous web by completely adhering a splicing tape over the trailing edge of the preceding web and partly adhering the splicing tape over the leading edge of the succeeding web using an adhesive while maintaining at least part of the trailing edge of the splicing tape viewed in the transport direction free of adhesive transporting the continuous web while applying at least one coating to the surface of the continuous web and allowing air trapped between the coating and the continuous web to dissipate between the trailing edge of the splicing tape free of adhesive and the continuous web.

14. A web comprising at least one splicing joint including a first web connected to a second web by a splicing tape, which splicing tape is completely adhered to the first web and partly adhered to the second web in that the splicing tape has a trailing edge contacting the second web free of adhesive, wherein the continuous web is coated with at least one coating layer.

15. The web according to claim 14, wherein the trailing edge of the tape is at least 0.5 mm.

16. The web according to claim 15, wherein the trailing edge is about 4 mm.

17. The web according to claim 14, wherein the coating comprises an aqueous solution of a colloid.

18. The web according to claim 14, wherein the web comprises one or more materials selected from the group consisting of base paper, a polyolefin laminated base paper, a synthetic polypropylene paper, a triacetate cellulose film and a polyethylene terephthalate film.

19. A web of photographic substrata comprising at least one splicing joint including a first web of photographic substrata connected to a second web of photographic substrata by a splicing tape, which splicing tape is completely adhered to the first web of photographic substrata and partly adhered to the second web of photographic substrata in that the splicing tape has a trailing edge contacting the second web of photographic substrata free of adhesive.

20. The web of photographic substrata according to claim 19, wherein the web of photographic substrata is coated with at least one coating layer.

21. A method for forming a coated continuous web, comprising the steps of:

obtaining a continuous web including a splice characterized by a splicing tape completely adhered to a trailing edge of a preceding web and partly adhered to a leading edge of a succeeding web with respect to a transport direction of the continuous web, with the splicing tape having a trailing edge free of adhesive and resting loosely on the succeeding web;

transporting the continuous web while applying a least one coating to the surface of the continuous web; and allowing air trapped between the coating and the continuous web to dissipate between the trailing edge of the splicing tape free of adhesive and the continuous web;

wherein the continuous web is selected from the group consisting of base paper, polyolefin wherein the continuous web is selected from the group consisting of base paper, polyolefin laminated base paper, synthetic polypropylene paper, triacetate cellulose film and polyethylene terephthalate film, or combinations thereof.

* * * * *